(12) United States Patent
Harding et al.

(10) Patent No.: US 11,038,821 B1
(45) Date of Patent: *Jun. 15, 2021

(54) CHATBOT ARTIFICIAL INTELLIGENCE

(71) Applicant: Progressive Casualty Insurance Company, Mayfield Village, OH (US)

(72) Inventors: Jarrod D. Harding, Mayfield Village, OH (US); Rick A. Bliss, Mayfield Village, OH (US)

(73) Assignee: PROGRESSIVE CASUALTY INSURANCE COMPANY, Mayfield Village, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/810,678

(22) Filed: Mar. 5, 2020

Related U.S. Application Data

(63) Continuation of application No. 16/374,495, filed on Apr. 3, 2019, now Pat. No. 10,601,740.

(51) Int. Cl.
  *H04L 12/58* (2006.01)
  *H04L 29/08* (2006.01)
(52) U.S. Cl.
  CPC .............. *H04L 51/02* (2013.01); *H04L 51/04* (2013.01); *H04L 67/10* (2013.01)
(58) Field of Classification Search
  CPC ......... H04L 51/02; H04L 67/36; H04L 51/04; G06N 5/02; G06N 20/00; G06N 3/004; G06N 5/04; G09B 7/04; G06Q 10/06; G06F 17/2247; G06F 17/27; G06F 17/279; G06F 9/453; G06F 17/2705; G06F 17/274; G06F 17/277
  See application file for complete search history.

(56) References Cited

U.S. PATENT DOCUMENTS

| | | | |
|---|---|---|---|
| 8,781,882 B1* | 7/2014 | Arboletti | G06Q 10/0639 705/7.39 |
| 10,142,208 B1* | 11/2018 | Mace | H04L 43/0817 |
| 2005/0165906 A1* | 7/2005 | Deo | H04L 41/5054 709/217 |
| 2010/0005396 A1* | 1/2010 | Nason | G06F 21/84 715/746 |
| 2011/0221765 A1* | 9/2011 | Nason | G06F 3/1438 345/626 |
| 2012/0303080 A1* | 11/2012 | Ben-David | A61N 1/36114 607/14 |
| 2014/0214135 A1* | 7/2014 | Ben-David | A61N 1/39622 607/62 |

(Continued)

Primary Examiner — Ninos Donabed
(74) Attorney, Agent, or Firm — Lempia Summerfield Katz LLC

(57) ABSTRACT

A system and method simulate a chat-based conversation with a human user. The system and method receive a text message through the chat system that enables a receiver to transmit an automatically generated response in real time during a chat session. The system and method recognize characters in a text message and generates an automatic prediction or classification using a conversational assistant pod that resides in a container. The system and method generate an automatic response and modify computing resources by replacing the conversational assistant pod and the container with a second conversational assistant pod and a second container without interrupting the chat session.

38 Claims, 12 Drawing Sheets

(56) References Cited

U.S. PATENT DOCUMENTS

| | | | |
|---|---|---|---|
| 2014/0279050 A1* | 9/2014 | Makar | G06F 16/9535 |
| | | | 705/14.66 |
| 2015/0067018 A1* | 3/2015 | Connolly | G06Q 30/016 |
| | | | 709/202 |
| 2016/0110240 A1* | 4/2016 | Reger | G06F 11/079 |
| | | | 714/37 |
| 2016/0127257 A1* | 5/2016 | Wang | H04L 45/30 |
| | | | 370/242 |
| 2016/0313906 A1* | 10/2016 | Kilchenko | G06N 3/0436 |
| 2017/0186034 A1* | 6/2017 | Mace | H04L 67/22 |
| 2017/0331709 A1* | 11/2017 | Lam | H04L 41/0213 |
| 2017/0374198 A1* | 12/2017 | de Silva | H04L 51/02 |
| 2018/0025726 A1* | 1/2018 | Gatti de Bayser | G10L 15/22 |
| | | | 704/257 |
| 2018/0096686 A1* | 4/2018 | Borsutsky | H04L 51/02 |
| 2018/0167414 A1* | 6/2018 | O'Reilly | G06N 3/08 |
| 2018/0181558 A1* | 6/2018 | Emery | H04M 3/4936 |
| 2018/0203755 A1* | 7/2018 | Das | G06F 11/079 |
| 2018/0210872 A1* | 7/2018 | Podmajersky | G06F 3/04886 |
| 2018/0219807 A1* | 8/2018 | Thinguldstad | G06F 16/3329 |
| 2018/0365212 A1* | 12/2018 | Banerjee | H04L 51/02 |
| 2019/0034409 A1* | 1/2019 | Curtis | G06F 40/123 |
| 2019/0052584 A1* | 2/2019 | Barve | G06Q 10/04 |
| 2019/0095844 A1* | 3/2019 | Dunne | H04L 51/046 |

\* cited by examiner

CHATBOT ARTIFICIAL INTELLIGENCE

CROSS REFERENCE TO RELATED APPLICATIONS

This application is a continuation of U.S. patent application Ser. No. 16/374,495, titled "Chatbot Artificial Intelligence," filed on Apr. 3, 2019, which is herein incorporated by reference.

BACKGROUND OF THE DISCLOSURE

1. Technical Field

This disclosure relates to chat-based conversations, and specifically to enabling computers to simulate conversations with human users using chat applications over a distributed network.

2. Related Art

Messaging applications are creating data communication channels that link devices together and permit users to converse with one another. These systems often allow users to speak on diverse subjects that interest them by sending text messages to one another in real time. A messaging client generally shows the names of the users communicating on the channel, and display users' words on individual lines so that other users can respond. The channels are often provided via the Internet. Because the systems are designed to facilitate direct conversations between users, they are not designed to simulate human interaction, facilitate conversations with human users, or integrate into websites and other applications.

BRIEF DESCRIPTION OF THE DRAWINGS

The disclosure is better understood with reference to the following drawings and description. The elements in the figures are not necessarily to scale, emphasis instead being placed upon illustrating the principles of the disclosure. Moreover, in the figures, like referenced numerals designate corresponding parts throughout the different views.

DETAILED DESCRIPTION

A conversational chatbot system and process (referred to as a conversational system or conversational assistant) interfaces any channel, system, application, device, legacy system or combination. The system imitates human interactions. The conversational systems know when to access knowledge bases, seek clarity, and when to join one or more human operators to a chat session. The conversational assistant is trained on knowledge-based relevant content, allowing conversational assistants to make sense of obscure topics and unusual inquires. Its clusters and orchestrations allow the conversational assistants to be adapted to many local and remote channels, systems, and mobile applications allowing the conversational systems to reach users when and where they are available. The conversational systems are powered by supervised and unsupervised learning algorithms (referred to as models) such a machine learning and/or natural language processing and understanding models that understands users and allow the conversational systems to communicate effectively with human users in real time. The term algorithm generally refers to set of instructions that are followed to carry out a particular task. The term encompasses modeling devices that reproduce behaviors such as recognizing words, phrases, images and/or videos and/or generating replies in response to recognitions automatically using a processor or computer. Algorithms often encompasses mathematical concepts.

The conversational systems may reside at a local physical location, reside in a cloud environment, or be distributed amongst them allowing the conversational assistants to scale with an enterprise. The term real time generally refers to a time frame imposed by external constraints, such as the time needed to respond to an inquiry or to engage in a conversation via a chat application. Real time operations in this context are those in which the conversational assistants' activities match the expected human perception of time needed to reply to a request or engage in a contemporaneous conversation or those in which the conversational assistants proceed at the same rate as a human user would behave if she or he were replying to another user on a chat application.

Figure 1:
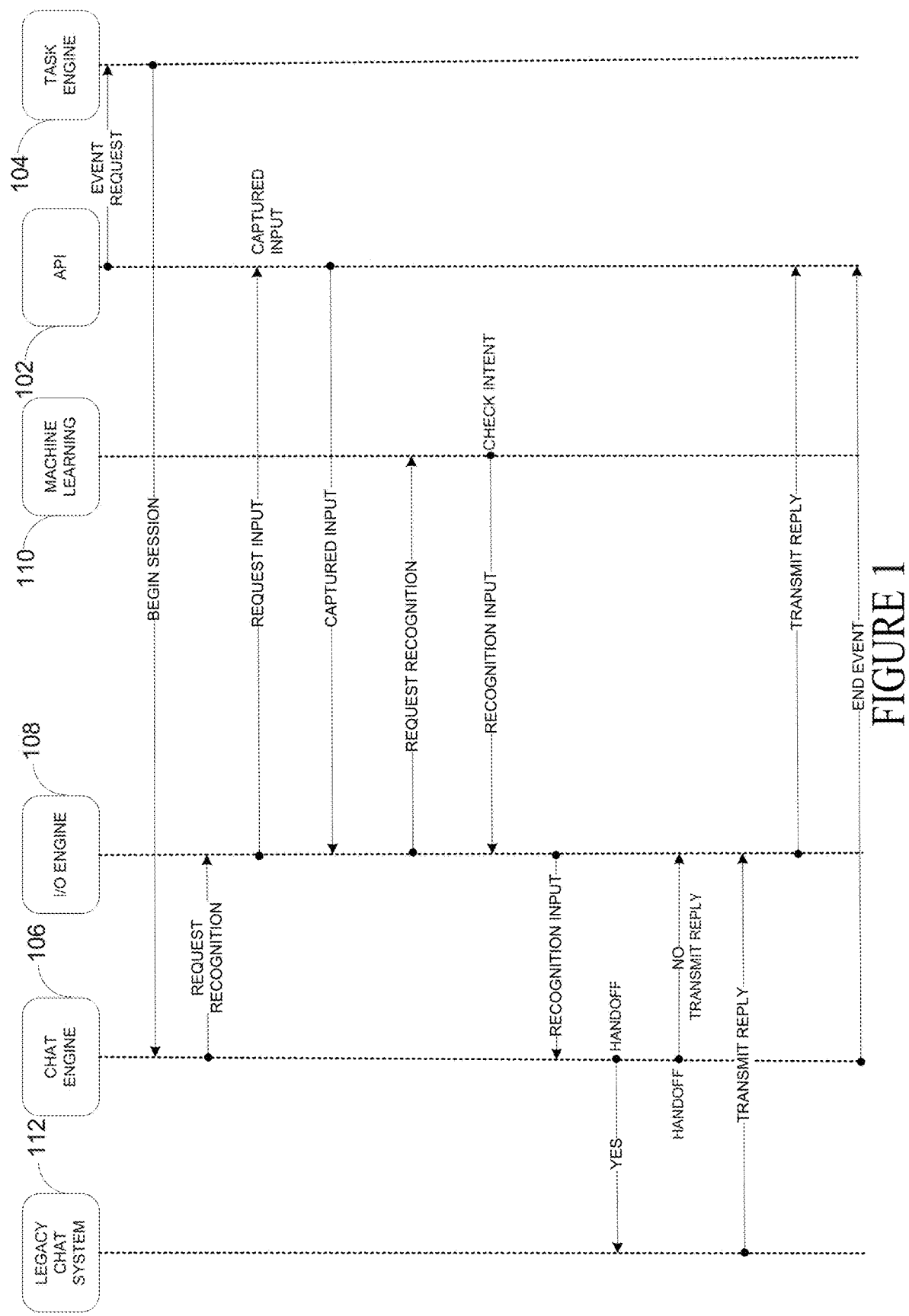
FIG. 1 is a process that simulates users that engage in conversations with human users.
Figure 2:
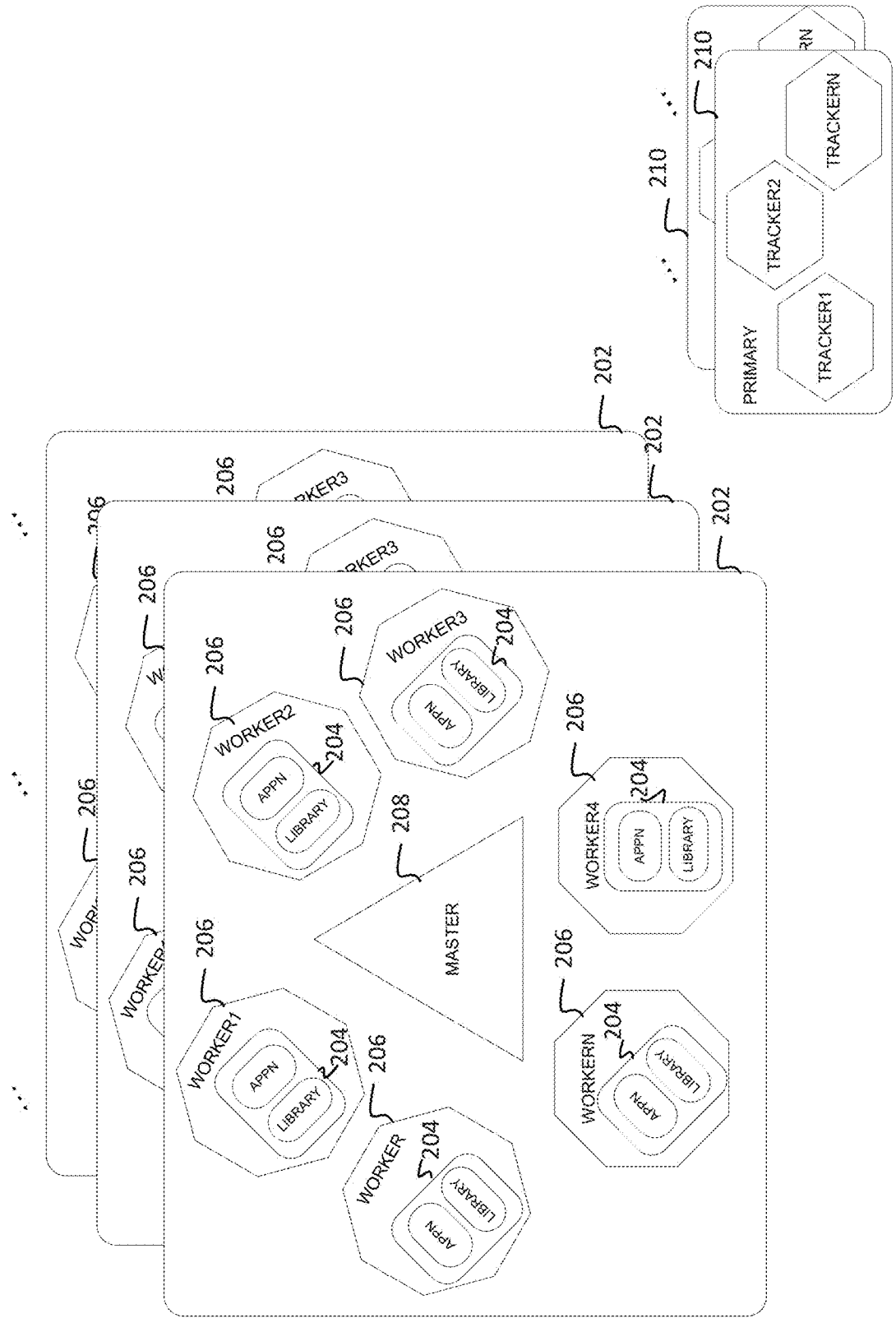
FIG. 2 is a representation of conversational intelligence clusters.
Figure 3:
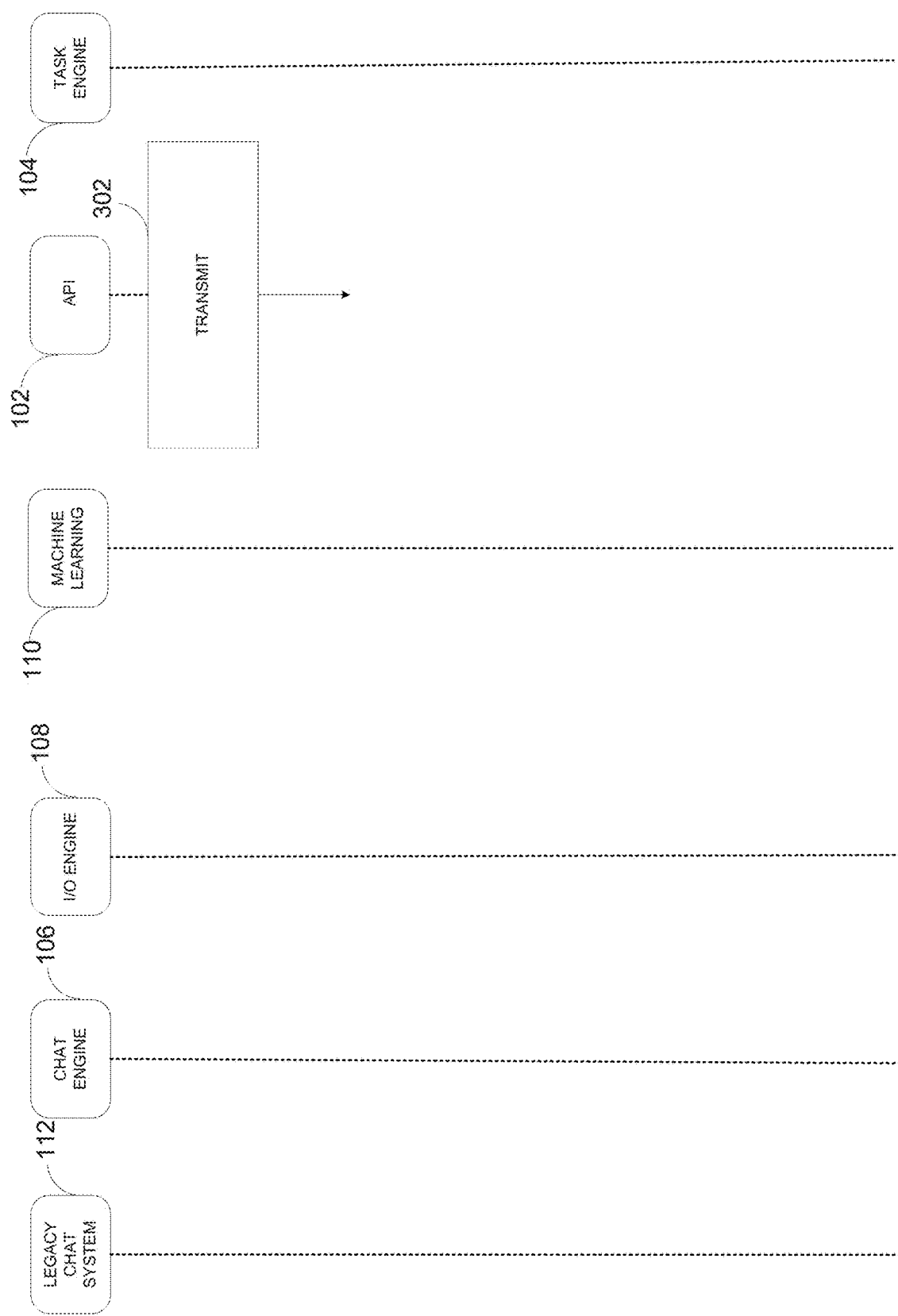
FIG. 3 is a process flow initiating an event.
Figure 4:
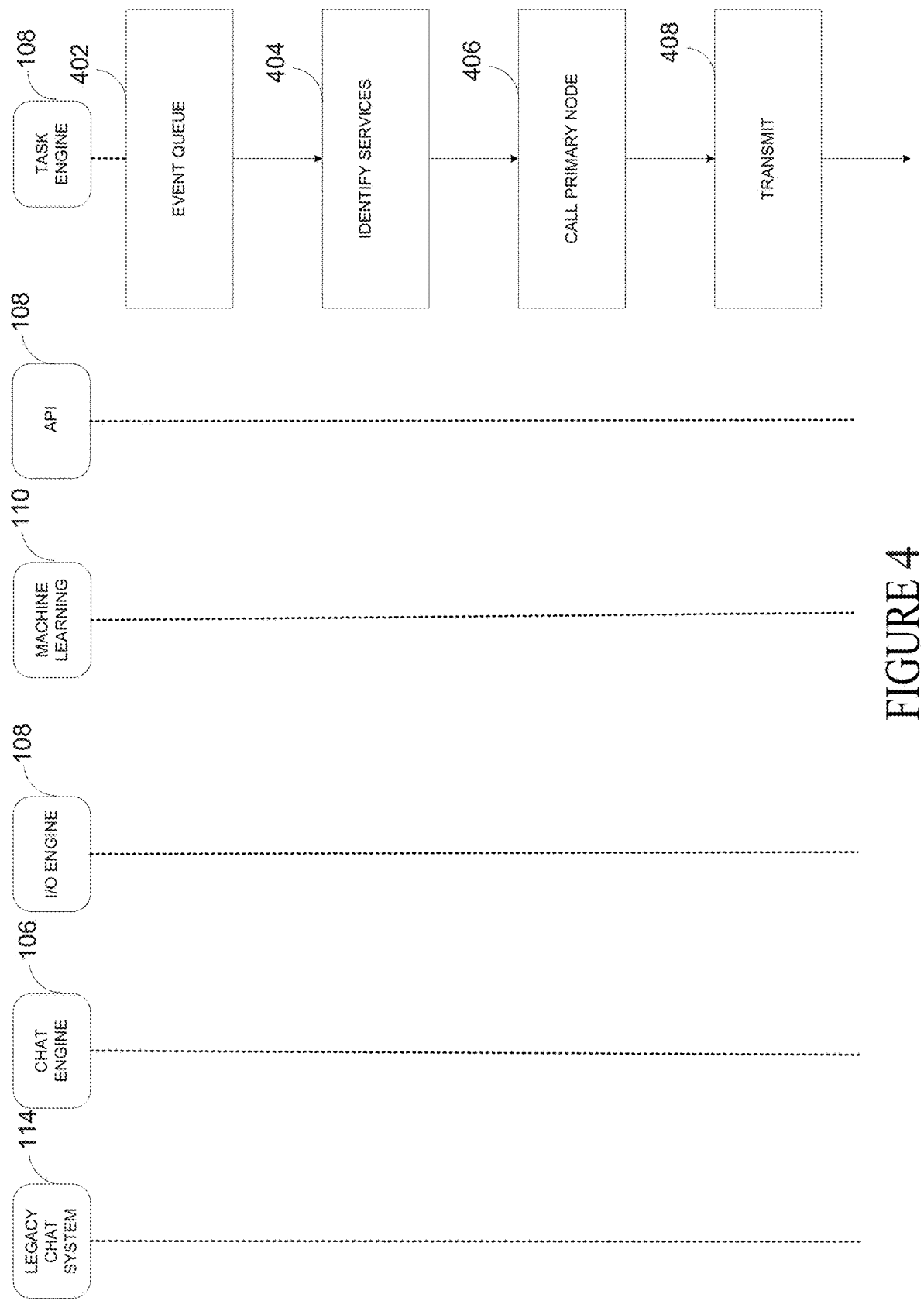
FIG. 4 is a process flow responding to a request for an event.

In use, a chat application may subscribe to a publicly exposed Application Programming Interface or an API 102 of FIG. 1. A request may come from a reverse proxy server designated by the name of the application server, such as progressive.com, for example, channeling a request to a destination. Instead of relying on a single server to provide functionality, one or more clusters 202 and a plurality of conversational assistant pods 204 run on worker nodes 206 automatically to serve chatbot intelligence and other functionality as shown in FIG. 2. A worker node 206 is a virtual or a physical machine which has a master node 208 that serves as an agent for communicating with a primary cluster 210 through an internal or private API. The conversational assistant pods 204 may send and/or receive texts, images and other content, emails, and/or provide access to content via a local or distributed network such as the Internet. By design, the primary cluster 210 may schedule as many instances of conversational clusters 202 as needed to service demand making the architecture dynamic and the processing environment elastic.

As shown in FIG. 2, one more master nodes 208 abstract the infrastructure to ensure there is a pool of resources. The master nodes 208 operate as schedulers. As such, any channel, system, application, device, legacy chat system or consuming application does not need to know what a particular server is doing or what kind of server is servicing its application. It merely needs to know that capacity exists. The disclosed architecture removes the scheduling of workloads from clients. The master nodes 208 schedule the worker nodes' conversational assistant pods 204 (shown within worker nodes 206) when and where they run best. This eliminates the need for clients to track changes in IP addresses, server names, configurations, etc. The conversational systems handle system orchestration through one or more primary clusters 210 that track all of the master nodes 208 and their worker nodes 206 to scale to user or enterprise demands.

Using the primary cluster 210 shown in FIG. 2, the conversational systems track the running workloads, what resources are available in the systems, and their respective states. The master nodes 208 schedule out the worker nodes 206 based on worker capacity. There are a number of processes that may schedule work, including the tagging of workloads, if a capability changes that does not require a hardware delegation.

Further, the conversational systems integrate self-healing apparatuses. If workloads require a number of worker nodes 206 and the master node 208 detects that one or more worker nodes 206 is about to fail or is failing, the master node 208 may drain traffic from the susceptible or failing worker nodes 206 (by routing further processing to another worker node 206 during a chat session), may stop the susceptible or failing worker nodes 206 from taking new chat sessions, and/or determine when existing chat sessions expire. The master node 208 may shut down unstable code or portions of the hardware executing the susceptible or failing worker nodes 206, the hosting software application, or the monitored servers completely while automatically replicating the failing worker nodes 206 or the monitored servers and bring the replicated replacements, including the conversational pods 204, on-line in a desired state that preceded the failures or susceptible states all the while the conversational systems remains running. This self-healing mechanism keeps the conversational system running without interruption in a real time flow (e.g., maintaining the dialogue exchange flow without interruption). The failure detection may occur in response to a notification from susceptible or failing worker nodes 206 or in response to the master node and/or primary node's 208 and/or 210 performance monitoring.

In some alternate applications, the detection occurs by executing automated predictive models that train on data generated during the operating periods (e.g., times) that occur well before a device failure (e.g., normal operating periods) and those that precede actual failures. The predictive models do not need to detect, identify, or know originating causes of a node, server, or cluster failure to predict its failure because the automated predictive models train on the operating conditions that precede the failure. The automated predictive systems are different from data-matching systems that recognize known device failures or causes, typically by comparing data generated during those failures (i.e., during the time the failures are occurring) against a database of similar data. The disclosed operating state-based approach can analyze one or more data feeds and/or data sets as they are generated to determine if one or more nodes, servers, or clusters will soon be operating in an undesired or an unstable state that precede a failure. The automated predictive models may be executed by the master node 208 monitoring the worker nodes 206 and/or the primary nodes 210 monitoring the conversational clusters 202 (e.g., monitoring the entire conversational system), which may execute some or all of the processes and systems described in U.S. application Ser. No. 16/038,980, entitled Robust Event Prediction, which is incorporated in its entirety herein by reference. The monitoring, routing, and replication system provides a self-healing mechanism to address actual and potential machine failure, facilitate maintenance, and fault tolerance without manual intervention or processing interruption. The master nodes 208 and/or primary nodes 210 automatically determines how to drain and distribute traffic from the failing nodes or clusters, initiate recovery, and replicate the processing by creating application and server instances within another node in the cluster or another cluster in the conversational system while maintaining processing continuity and system security.

In FIGS. 1-4, an event triggers a chat session. An event is a textual action or occurrence detected by a task engine 104 served by the primary node 210. A chat session refers to a series of requests, responses, and replies that comprise an entire conversation (e.g., the real time exchange that occurs on the computer) in a chat application. The API 102 announces the event to the task engine 104 ST 302, which enters it into an event queue at 402 of FIGS. 3 and 4. The event queue is a data structure, in which events are serviced in a sequence or order. It is more than a collective storage or grouping of things. Some event queues follow a first-in-first-out (FIFO) sequence, while others are based on factors other than the order of insertion; for example, some events are assigned a priority that changes placement in the sequence. In other systems, a dequeue is used in which events are added or removed from either an insertion input/output port or a removal port. That is, the dequeue may operate in a last-in-first-out (LIFO) sequence, a FIFO sequence, or a combination of LIFO and FIFO sequences during a conversion/chat session.

In response to a get command, the primary node 210 shows all the nodes that may be used and their status in the conversational system clusters 202 at 404 and a describe command shows the details of the resources from a container in the conversational assistant pods 204. The task engine 104 establishes a connection with the primary node 210 at 406 and 408 of FIG. 4 via a node port, which determines which conversational system cluster 202 to deploy the event based on node availability and resource availability. The primary node 210 includes an integrated load balancer that balances the conversational system clusters 202 through a round-robin routing against the physical or virtual machines. The master node 208 in a conversational system cluster 202 may employ a single or multiple instance of conversational assistant pods 204 with each operating in their own containers on the same or different worker nodes 206 depending on available resources.

A container is a standard unit of software that holds the application's code (e.g., conversational assistant pods 204), libraries, and dependencies so that the application may run quickly and reliably from one computing environment to another computing environment. A container is a standalone executable software that includes everything needed to run a software application; it includes code, runtime software, system tools, system libraries, and the system and variable settings that make the containers predictable, repeatable and immutable in computing environments. A library is a collection of nonvolatile resources used by the application that include configuration data, message templates, prewritten code, subroutines, class values, and/or type specifications. In some implementations, a library is referred to as a partitioned data set that has a defined interface by which behavior is invoked and outcomes are delivered.

The use of containers makes the conversational assistant pods 204 and other applications portable among any systems running a container-supported operating system (OS), such as Windows and Linux. By placing conversational assistant pods 204 in containers and automating deployment, scaling, and management via master and primary nodes 208 and 210, the conversational system automatically scales to application use and user demand. In other words, this architecture does not require multiple servers running at all times. The system can utilize open source container applications on top of the containers, and master and primary nodes 208 and 210 container cluster managers for orchestration and management. In the conversational system, pods are the smallest deployable units of the computing system that are created and managed. A pod operates in one more containers that operate with shared storage/network, and a specification for how to run the containers. A pod's contents are co-located and co-scheduled, and run in a shared context. In FIG. 2, the containers are depicted by the enclosure of an application APPN, which represent the conversational assistant pods 204 and their libraries LIBRARY among other applications that may also be accessed and/or executed in containers.

The disclosed architecture is different from what is normally done in which resources are manually allocated using an operating-system type manager alone. In the conversational system, the APIs drive the size, configuration, and elevation of the containers. Containers deliver the continuous integration to the service pipeline. The software automatically elevates as different criteria is met. The operation is analogous to virtual machine-ware in that the entire environment is packaged into a single file. So, the architecture can change without changing the entire processing system and allows developers to test various systems simultaneously without spinning off hardware. It can also run on a cloud-based OS that controls pools of computer, storage, and/or networking resources.

Figure 5:
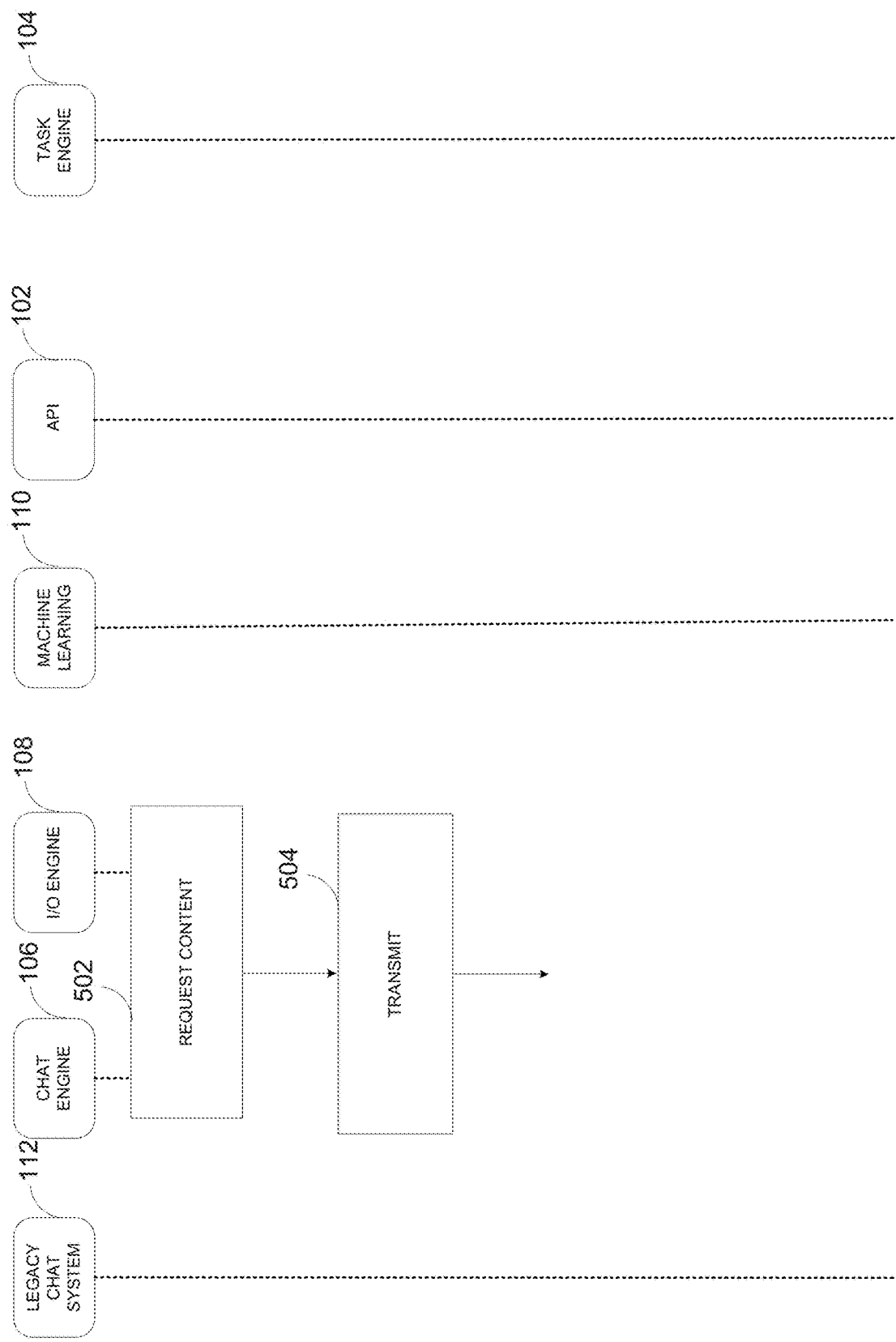
FIG. 5 is a process flow of a chat engine and I/O engine requesting input.
Figure 6:
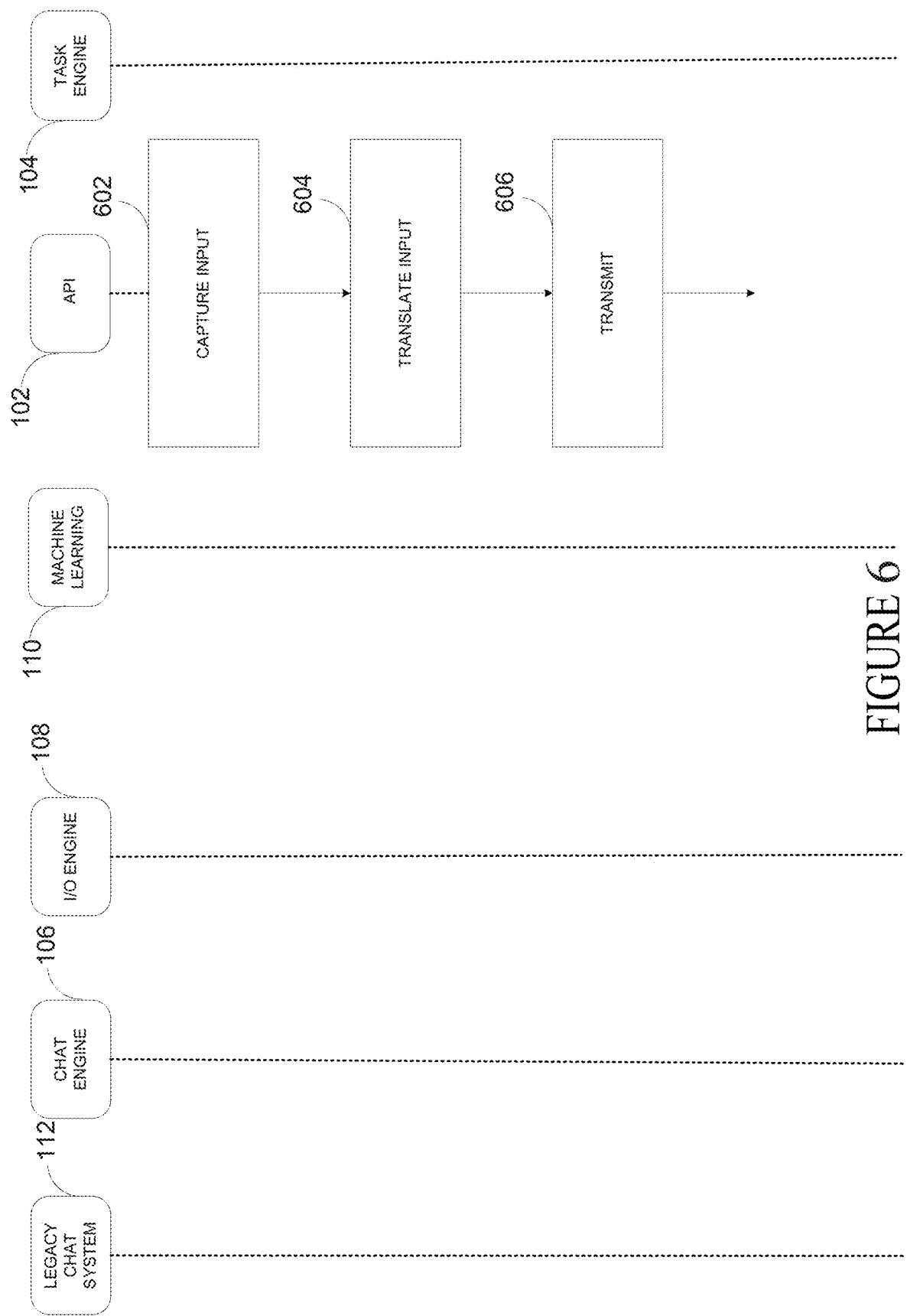
FIG. 6 is a process flow of an exposed API capturing content.
Figure 7:
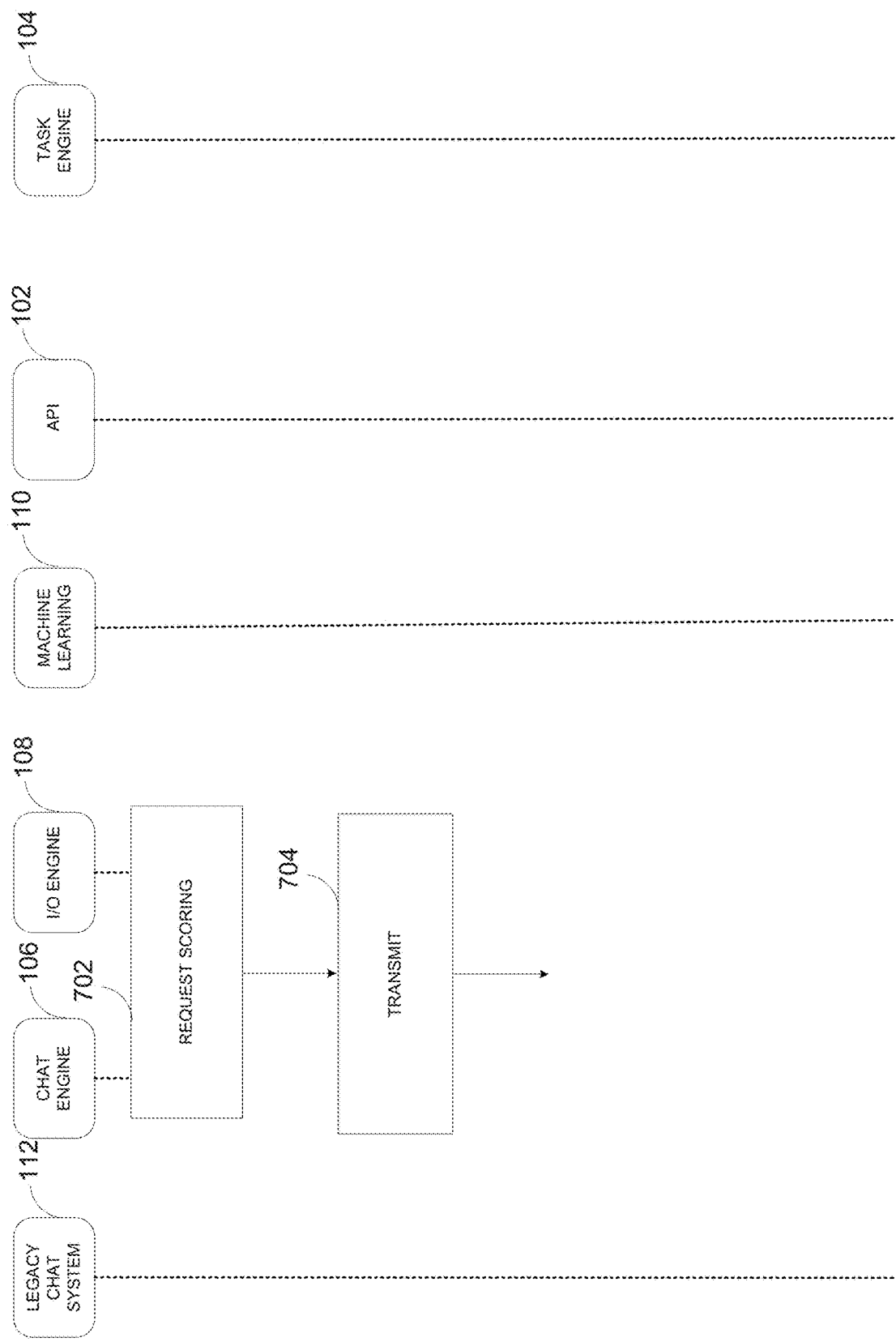
FIG. 7 is a process flow of a chat engine and I/O engine managing recognition.

In FIGS. 1 and 5, a chat engine 106 and an I/O engine 108 running in one or more conversational assistant pods 204 requests content from API 110. The API 110 captures the input, which may include free-form text, at 602 of FIG. 6, performs protocol conversions if necessary, at 604, and returns the content to the one or more instance of conversational assistant pods 204 at 606. In response, the chat 106 and I/O engine 108 requests a recognition and corresponding confidence levels at 702 and 704 of FIG. 7.

Figure 8:
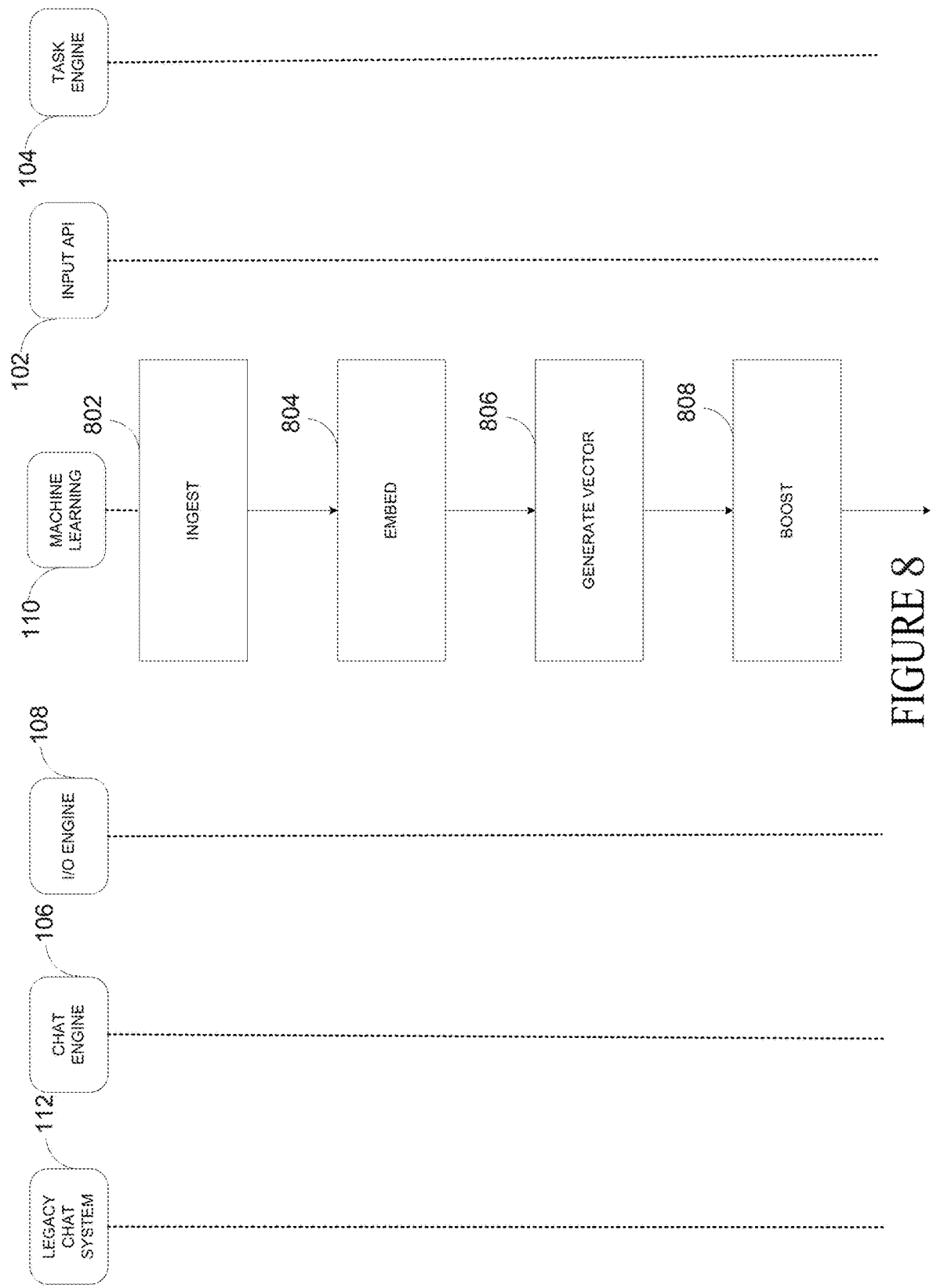
FIG. 8 is a process flow of a machine learning algorithm or model.

In FIG. 8, a single hidden layer neural network converts the raw text and characters captured by API 110 into a chat vector. The term vector refers to individual measurable properties or characteristics of the text and/or the images processed. The scalar variable of the vector may be assigned by a scalar function based on the spatial relationships of the words at 802-806. In some systems, the scalar functions may be adjusted by a weighting function that give some words and phrases and characters of the chat vector more "weight" or influence than other words and phrases. Weights may be assigned based on word and phrase counts captured in the input, their presence in an active grammar, or based on their association with pre-identified intents. In an insurance context, exemplary intents may include windshield information, rental car coverage, move payment information, contact information, and other information for example. An active grammar is a file that contains a list of words and phrases recognized by a grammar-based engine and/or machine learning algorithm.

In FIG. 1, the machine learning algorithm designates captured input into classes through rules or decision trees that process the chat vector at the worker nodes 206 at 110. The decision trees process the chat vector based on features that predict the intents that the chat vector is associated with.

An intent is represented through a data type in the conversational system; it is an interpreted aim or purpose of a textual expression. For example, an intent could be repairing a windshield or moving a payment date. When associated with the chat vector, an intent may include elements and attributes that facilitate the recognition of the text-based utterances and/or visual attachments.

In FIG. 8, each branch in the decision tree divides data elements into several groups. Each leaf node is allocated with a single label, such as a class or a predicted value. The data is allocated to the appropriate leaf node, and the prediction is the label of that leaf node. To avoid overfitting, multiple decision trees are added together. For instance, when one or more conversational assistant pod 204 requests attempt to identify the captured input as a request for on-line insurance servicing, the prediction at any point is the sum of the predictions of the individual decision trees trained on on-line servicing data.

Before use, each decision tree is trained iteratively one decision tree at a time. For example, when a decision tree attempts to identify an insurance claim within a text, the system first trains a decision tree on words and phrases that are unique to servicing insurance policies on-line. The training words and phrases may be generated from empirical data that may be categorized by a predetermined number of intents, such as the five intents described above. The training words and phrases are preprocessed that removes suffixes from words, punctuation, numbers, and converts the training words and phrases to lower case. A Document-Term Matrix is generated, which may include a column of intents associated with counts and occurrences of each word and phrase. Training may adhere to a predetermined split with training and testing words and phrases adhering to a ninety-ten (90/10) split. A cross-validation may be executed to ensure stability. A ten-fold ten-times repeated cross-validation model may be used to model the stability of the machine learning algorithm before evaluating the trained algorithm. The decision tree is trained to minimize a loss function—such as a mean squared error (when mean is used) or mean absolute error (when median is used), for example,—by recursively splitting the training data in a way that maximizes a recognition of on-line insurance servicing criterion in this example until a limit is met. The criterion is chosen so that the loss function is minimized by each split. In some alternate machine learning algorithms, the process is based on an extreme gradient boost.

A second decision tree is then trained to minimize the loss function of the first decision tree when its outputs are added to the first decision tree. This is achieved by recursively splitting the training data according to a second criterion. The criterion may be calculated based on gradient statistics. A third decision tree is then sequentially trained to minimize the loss function of the second decision tree when its outputs are added to the first and the second decision trees. This is achieved by recursively splitting the training data according to a third criterion. Thereafter, "n" number of subsequent trees are sequentially generated and added to the algorithm such that each subsequent tree aims to reduce the errors rendered by the previous tree. Each tree learns from its immediate predecessors and updates the learning algorithm's residual errors. Hence, the tree that grows next in the sequence will learn from an updated version of the residuals and in effect render a stronger learned model by effectively combining the predictive power of all of the prior decision trees.

The time needed to train a tree-based algorithm is proportional to the number of splits that are evaluated. Since small changes in the split may not significantly affect performance, some methods group features into bins and split the bins instead of the features based on gradient statistics. This evolutionary process is like subsampling the number of splits that the prediction or classification algorithm evaluates. Since the features can be binned before building each tree, the evolutionary process speeds up training and reduces computational complexity.

When the characteristics of the chat vector are classified by the machine learning algorithm and/or optional deterministic rules that execute comparisons between recognized and predetermined words and/or phrases, the captured input prediction is generated and embedded or mapped into the metadata associated with the captured input. Some conversational assistant pods 204 then validate the predictions at the worker nodes 206. For example, if a captured input is designated as a request to move a payment date, the worker node 206 may execute a comparison against valid payment date content, valid calendar dates, or other criteria. If unconfirmed, the captured input is routed to a recursive analysis of the processing described above (e.g., "n" number of repetitions of the prediction analysis described) or routed to an operator serving a legacy chat system 112, where the human operator generates a response to the captured input at 904 in FIG. 9.

Figure 9:
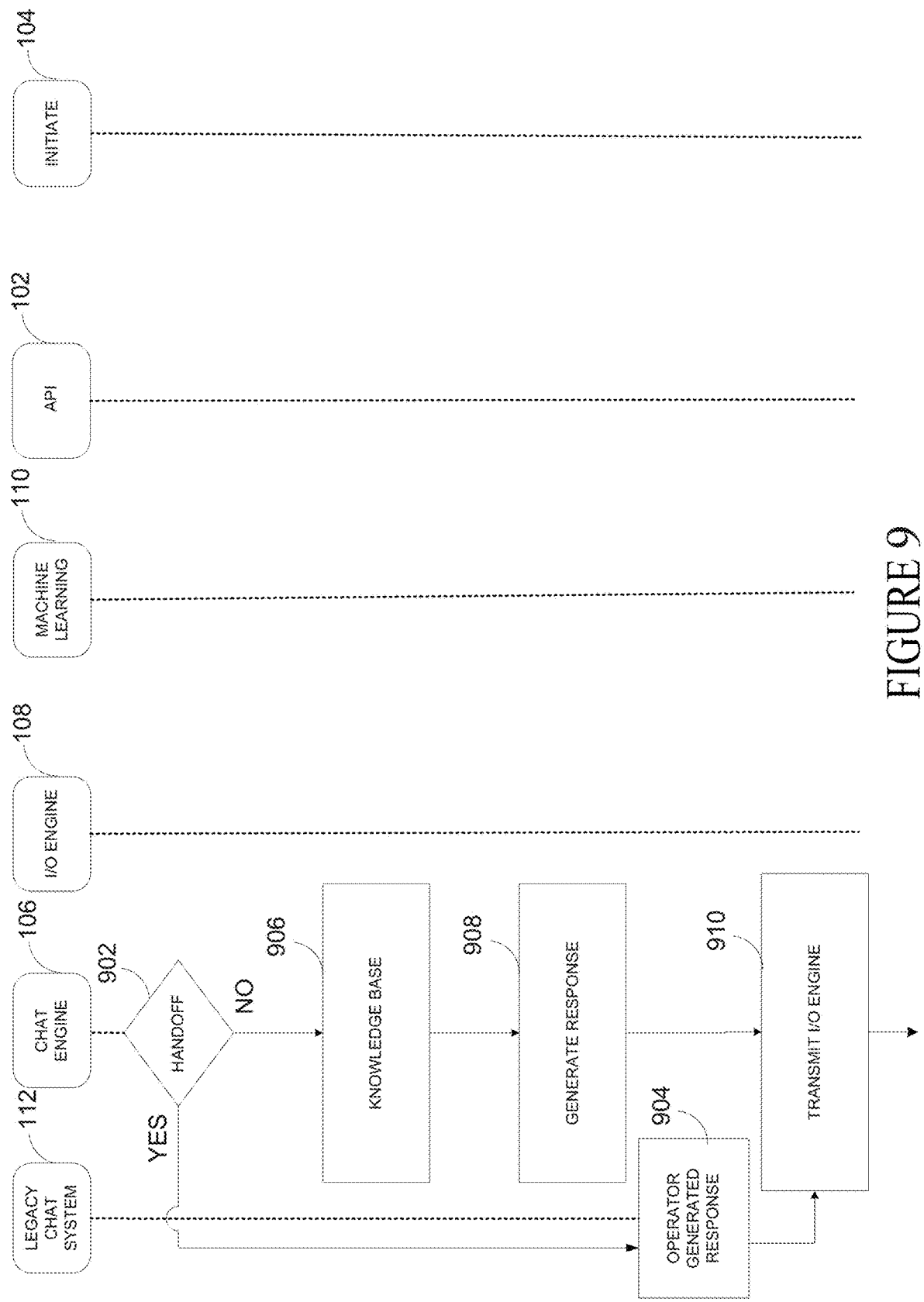
FIG. 9 is a process flow of the chat engine and an operator generating a response.
Figure 10:
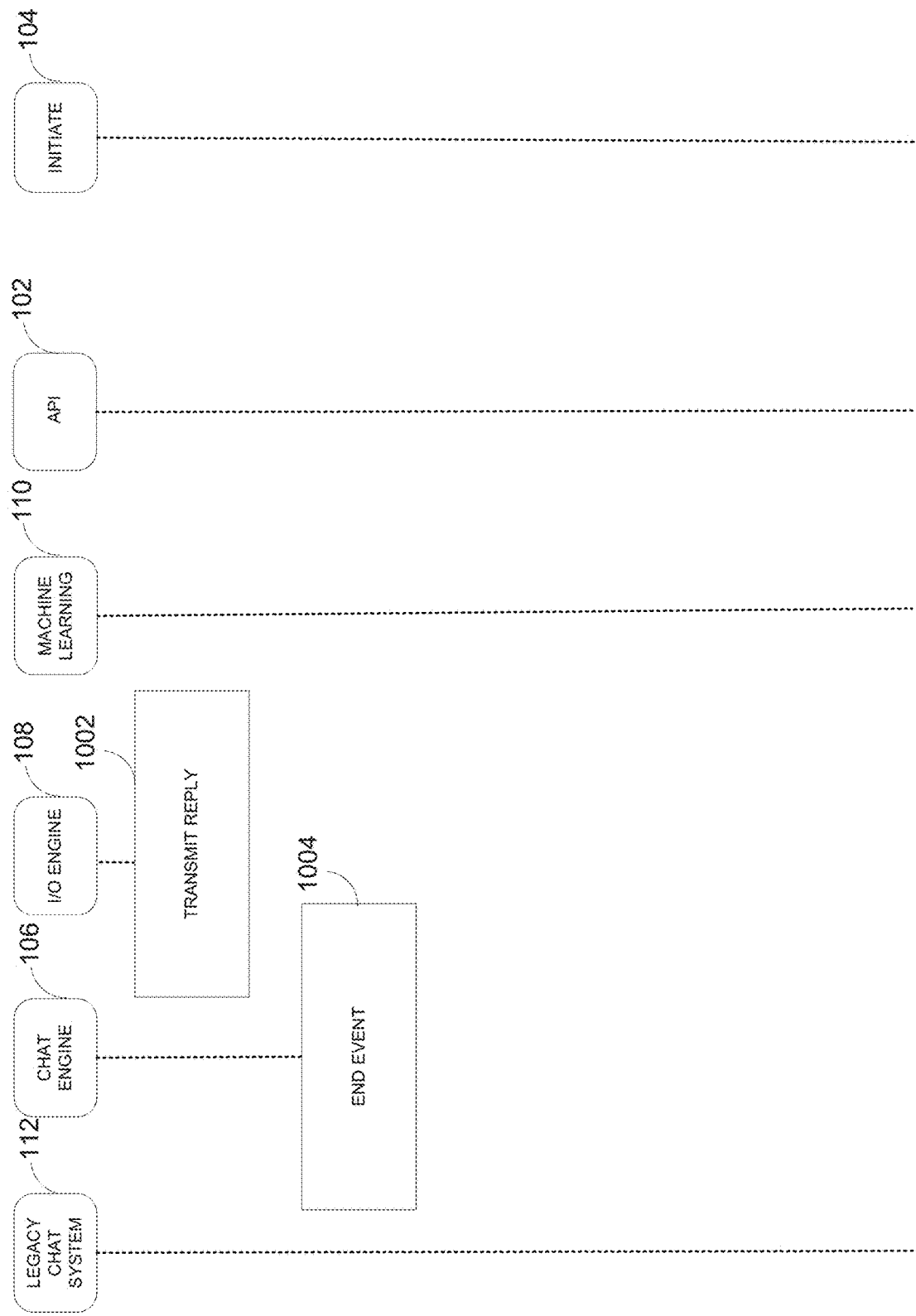
FIG. 10 is a process flow of the chat engine and the I/O engine transmitting the response.

With the words and phrase patterns isolated and classified by the predictions, some chat vectors are processed by a supervised learning algorithm that interprets the text based on a knowledge base at 906 associated with the prediction to automatically generate a response at 908 that is transmitted to the I/O engine 910 of FIG. 9. This analysis can be accomplished in a number of ways, including through a natural-language recognition engine or a grammar-based recognition engine that recognize written utterances. A written utterance is a broad term, but it generally refers to the recognition of written or textual input by comparing it to a vocabulary associated with the prediction and matches the utterance to the selected vocabulary of words. A vocabulary is the total list of words the grammar/natural language-based engine compares the written input against. The vocabulary is made up of all the words in the active grammars. Some alternate systems also use tokenization (defining what a word or phrase means in grammar-based recognition engine), part of speech tagging (POS) where content is tagged to recognize the content, a sentiment learning that identifies text based on the surrounding words or context of a word or phrase, and/or other recognition strategies.

Besides responding directly in text via an automatic reply or an operator reply, the I/O engine 108 may respond with text and images, videos, and links to resources that specifies the protocol to be used in accessing the resources, the name of the server that the resources reside, and optionally the path to the resources. The I/O engine 108 may also launch client-side browsers and automatically generate responses by writing and sending emails. The emails may include requests for additional information or documentation and provide quotes or offers for sale. For example, a user servicing a vehicle insurance policy, may receive a quote for a homeowner's policy via an email.

Some conversational systems know users' identities before triggering an event when the users are authenticated before initiating one or more conversational sessions. In these systems, the conversational systems may have permissions to access user data and tailor the user's experience based on access to stored user profiles. Identification occurs via a Web server configured as a reverse proxy. The reverse proxy may be containerized and handle open authorizations that allow user account information to be processed by remote applications without exposing their credentials, such as the user's passwords. In one use case, an enterprise authenticates from a WINDOWS frontend to a LINUX back end, which enables machine learning processing in real time within about 300 to 600 milliseconds, for example.

Figure 11:
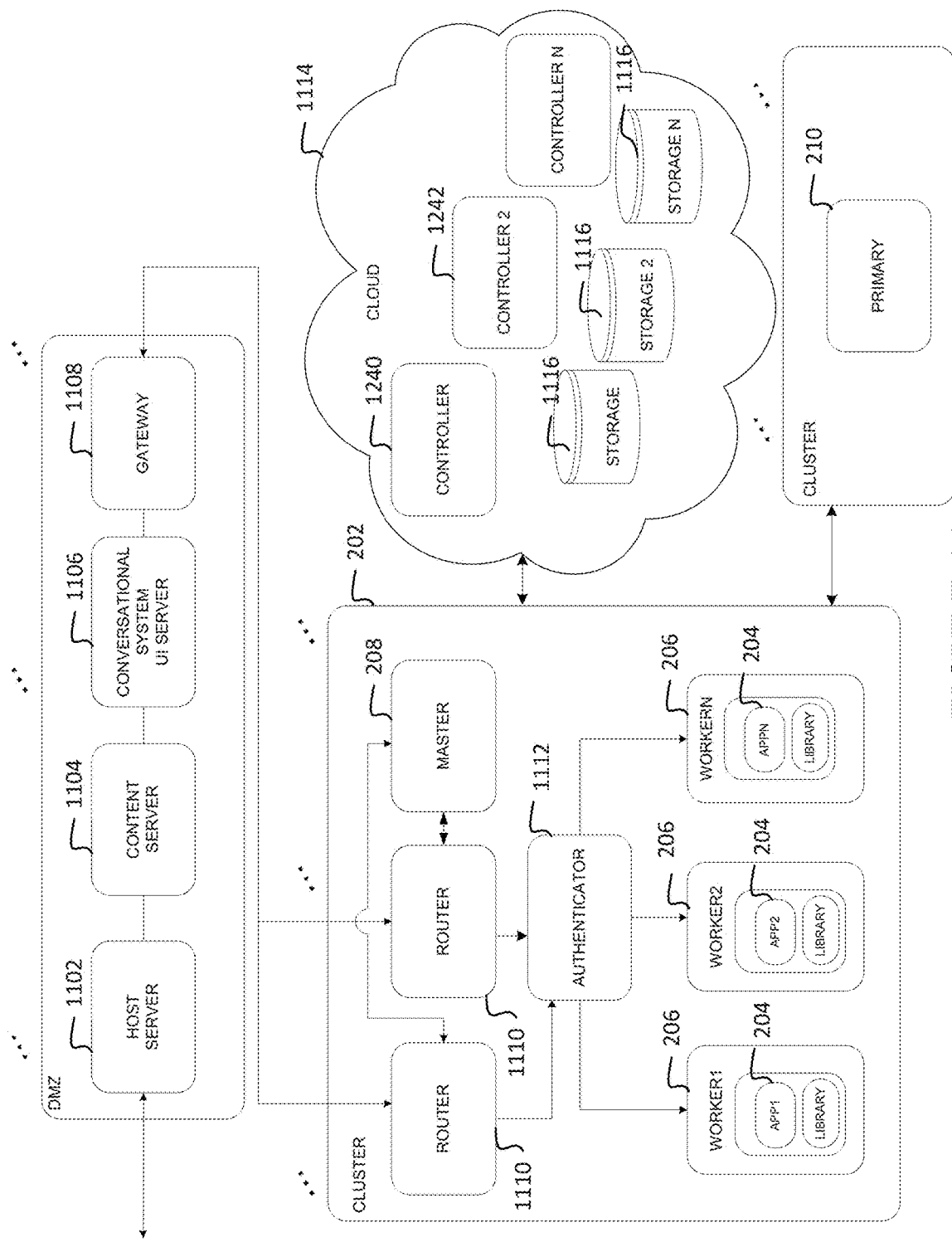
FIG. 11 shows an enterprise integration of a conversational intelligence system.

FIG. 11 shows an enterprise integration of a conversational system. The User Interface (UI) may be hosted in a cluster, such as a policy-servicing cluster when used in an insurance enterprise. Requests flow through a landing page served by a host server 1102 that passes requests to a content server 1104, which subscribes to the conversational system through a conversational UI 1106. In FIG. 2 the request passes through a gateway 1108 that flows through a load balancer that distributes the UI requests to the conversational clusters 202. The gateway 1108 controls flow from the DMZ (Demilitarized Zone) to the MZ (Militarized Zone). The UI makes a request into the to the conversational clusters 202. When the conversational clusters 202 receives the request, the conversational clusters 202 uses a reverse proxy. By reading the host name and cross-referencing it to an index stored in memory, the master nodes 208 identifies where the conversational assistant pods 204 reside. Through a round robin or cyclical allocation delegation, master nodes 208 routes an OS request derived from the user request to the desired working node 208 hosting the conversational assistant pods 204. A round robin flow ensures workload is distributed and balanced. The master nodes 208 also tracks a service layer that tracks the current and prior operating state of the conversational assistant pods 204. The master nodes 208 knows when a conversational assistant pod 204 fails or is entering an unstable or failure state and when to drain traffic from the suspect conversational assistant pod 204 and start another conversational assistant pod 204. Here, conversational assistant pods 204 sit on worker nodes 206 and the worker nodes 206 reside in conversational cluster instances 202. Many conversational assistant pods 204 have one container or interrelated containers. In a current implementation, the conversational assistant pods 204 run in one container on a single worker node 206. The conversational system replicates the conversational assistant pods 204 to provide multiple containers and multiple conversational assistant pods. Automated replication also allows for vertical application scaling and ensures that there is never a loss of production, especially when the primary node 210 or the master node 206 system take a worker node 206 or a conversational cluster 202 off-line, which also may occur during system maintenance.

When a user logs-into an enterprise website, the user may land on a splash page which is a web page that the user encounters before continuing to the main content of a web site. There the user is given a chat option that facilitates among other things a question answer exchange. When the user logs-in, the system identifies the user at an authenticator 1112 before accessing the conversational assistant pods 204. In FIG. 11, the user request may also hit a content serving API too, such as a publicly exposed on-line insurance servicing API or another insurance-based API for claims processing, quoting, payment processing, and/or other API that provides access to customer data and insurance policy parameters. Therefore, in an exchange seeking a change in an insurance payment deadline, for example, the conversational system knows the identity of the user, if it has permissions to access the select fields—such as the payment fields—and knows if it has permissions to change a payment deadline. In FIG. 11, the conversational assistant pods 204 may communicate through a UI on the client side through a java script that uses a node framework. In FIG. 11, when the user sends free-form text, a script processes the text at the client or server side, translates it into a model form, before processing via the machine learning and natural language/ grammar-based algorithms/engines at the server side.

In FIG. 11, the router nodes 1110 serve two functions. The first is the routing of traffic to specific worker nodes 206 based on the host name or a similar designation and the master node 208 delegations. It does the routing to the conversational cluster 202 nodes. Second, the router nodes 110 provide an interface between the enterprise network and the conversational system.

In FIG. 11, the user never communicates directly with the worker nodes 206. The router nodes 1110 talk to the master node registry, which is where all of the images that execute the conversational assistant pods 204 are stored. As functionality is added, the functionality and related information to it are stored in the master node and primary node registries. In FIG. 11, the master node 208 handles what needs to be scheduled and where. The master node 208 schedules the conversational assistant pods 204 and the other application nodes. The applications are deployed in pods within containers in the worker nodes 208. The worker nodes 206 are generic, agnostic, and ubiquitous. The worker nodes 208 are controlled by the master node 208, and receive their containers from the infrastructure nodes.

In some systems, a cloud 1114 provides the described conversational system functionality described above or logs system performance as shown in FIG. 11. In FIG. 11, a relational database system 1116 tracks how often the conversational systems respond correctly, what percentage of the responses are being handled by the conversational system versus an operator or legacy chat system, etc., via a structured query language. The cloud 1114 also tracks metrics and stores metadata about the operation conversational system and operating practices of the conversational system. In FIG. 11, a legacy chat application may also be accessed when a catastrophic failure occurs in the conversational system or if the conversational system or the conversational system is unable to provide a correct response. When those conditions occur, the requests are routed to the legacy systems, which deliver the text to a customer service representative 114 or operator that generates and transmits a reply.

In an exemplary application of FIG. 11, the conversational system ingests input in the form of a JavaScript Object Notation (JSON), parses the input, processes the input via a machine learning algorithm and a grammar-based or natural language recognition engine, scores its determination, compares the determination to an appropriate reply from a knowledge base, and either automatically responds back to the user or routes the request to a legacy chat system for a manual reply. The conversational systems automatically generate replies when the confidence level of the recognized response exceeds a predetermined threshold. Otherwise, the response is routed to a legacy chat system.

Figure 12:
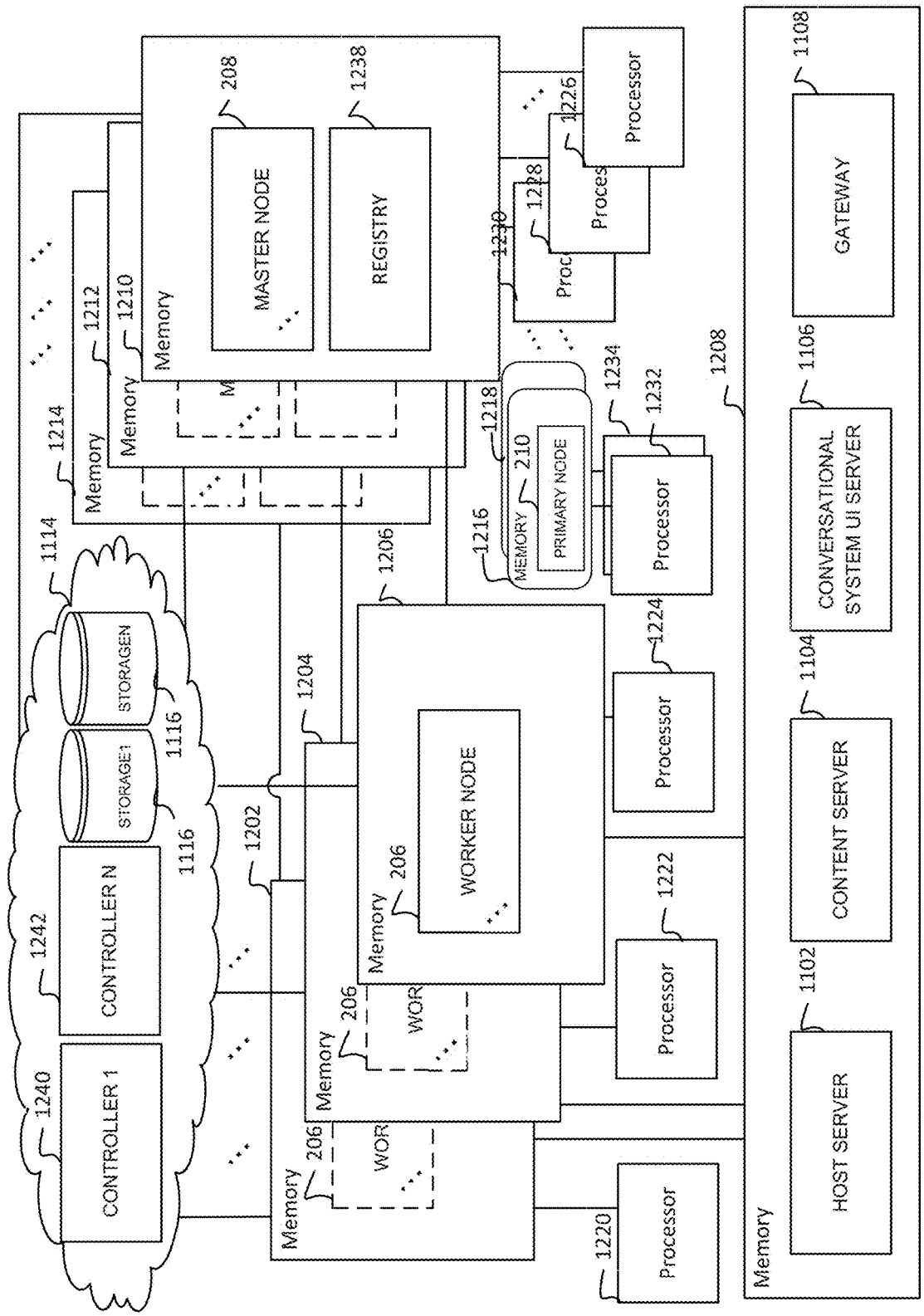
FIG. 12 shows another conversational intelligence system.

FIG. 12 is a block diagram of another conversational system. The system comprises multiple processors 1220-1234 (e.g., CPUs, GPUs, etc.), multiple non-transitory media 1202-1218, such as multiple memories (the contents of which are accessible to the processors 1220-1234, respectively). The memories 1202-1218 may store instructions which, when executed by one or more of the processors 1220-1234, respectively, cause the systems and methods to render some or all of the functionality associated with the conversational systems and some or all of the functionality of the evolutionary processes that generate the machine learning algorithms, grammar-based recognition engine, and/or other recognition models. For example, the memory 1202-1218 stores instructions which, when executed by one or more of the processors 1220-1234, respectively, causes the system to render the functionality associated with one or more worker nodes 206. The symbol " " shown in the worker node blocks 206 in the FIGS. illustrate other elements that comprise the worker nodes 206. The memory 1202-1218 further cause the system to render the functionality associated with the host server 1102, the content server 1104, the conversational system user interface server 1106, the gateway 1108, and the master node 208. The memory 1202-1218 further cause the system to render the functionality associated with the registry 1238, the primary node 210, the cloud environment 1114, and the cloud controllers 1240 and 1242. In addition, data structures, temporary variables, metadata and other information are stored in one or more memories 1202-1218.

The processors 1220-1234 may comprise a single processor with multiple cores, or multiple processors with multiple cores, on multiple devices or distributed across more than one system that run in parallel. The processors 1220-1234 may be hardware that executes computer executable instructions or computer code embodied in the memory 1202-1218 or in other memory to perform one or more features of the disclosed system. The processors 1220-1234 may include a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memories 1202-1218 or storage disclosed may retain an ordered listing of executable instructions for implementing the functions described herein. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random-Access Memory (RAM), a Read-Only Memory (ROM), an Erasable Programmable Read-Only Memory (EPROM or Flash memory), or a database management system. The memories 1202-1218 may comprise a single device or multiple devices that may be disposed on one or more dedicated memory devices or on a processor or other similar device.

The memories 1202-1218 may also store computer code that may include instructions executable by the processor 1220-1234. The computer code may be written in any computer language, such as C, C++, assembly language, channel program code, and/or any combination of computer languages. The memories 1202-1218 may store information in data structures.

The functions, acts or tasks illustrated in the figures or described may be executed in response to one or more sets of logic or instructions stored in or on non-transitory computer readable media as well. The functions, acts or tasks are independent of the particular type of instructions set, storage media, processor or processing strategy and may be performed by software, hardware, integrated circuits, firmware, micro code and the like, operating alone or in combination. In one embodiment, the instructions are stored on a removable media device accessible to a remote machine. In other embodiments, the logic or instructions are stored in a remote location for transfer through a computer networks or over wireless or tangible communication lines. In yet other embodiments, the logic or instructions may be stored and executed by multiple GPU servers.

While each of the conversational assistant pods 204 shown and described herein operate automatically and operate independently, they also may be encompassed within other systems and methods and execute any number "n" of iterations of some or all of the processes used to enhance conversations, recognize dialogue, render predictions, and/or automatically generate chat-based replies. Alternate processing agents may include any combinations of structure and functions described or shown in one or more of the FIGS. These automated processing systems are formed from any combination of structures and functions described herein. The structures and functions may process additional or different input. For example, alternate machine learning algorithms may perform predictions based on a contextual analysis too. By including contexts in the training of the machine learning algorithm, the machine learning algorithm's automatic predictions are not limited to the processing of chat vectors to decision trees trained only on word and phrase combinations. This context-based training constitutes an improvement over traditional training as the machine learning algorithms are also based on user intentions reflected in contexts expressed in the textual exchanges (via recognizing holistic context-sensitive exchanges by considering statements that surround a word or passage), rather than being based exclusively on isolated word and phrase input. The inclusion of sub-textual analysis in the machine algorithm's training enables a more flexible, nuanced, and accurate classification that can easily be tailored to the processing agent's applications.

Consider content that includes the term "comprehensive" used multiple times in a textual exchange. In processing the input, the machine learning algorithm concludes that the user has demonstrated an unfamiliarity with insurance based on the user's failure to provide responses to common insurance questions that have previously arisen in the chat. In viewing the context, the predetermined number of unanswered questions and the information provided during the dialogue indicate that inquiry is not from a customer of the insurance carrier (e.g., that may be confirmed via a credential verification). Based on the use of the term "comprehensive" in the exchange, the machine learning algorithm associates and clarifies these contexts as a request for a bundled insurance quote.

If a machine learning algorithm were trained on the term "comprehensive" alone, without context, and specifically with respect to automobiles, the term "comprehensive" would be understood to refers to one of three insurance coverages. The two other coverages are liability and collision. Collision covers damage to vehicles following a collision, and comprehensive fills in the gaps by covering damage to vehicles caused by anything other than a collision. While a recognition of the input alone would mistakenly classify the dialogue as a request for insurance policy servicing that should be routed to an insurance policy servicing destination, by including contexts and contextual associations in the machine learning algorithm training and/or the selection of the natural language or grammar-based vocabulary, the machine learning algorithm and grammar/natural language-based recognition engines automatically recognize the requests as related to an insurance quote.

In yet another alternative conversation system, a detection system accurately detects misunderstanding in chat-based exchanges, and in response requests supplemental information by transmitting replies for clarifications during the chat session through textual responses or serving a Uniform Resource Locator (URL) requesting clarifications or additional information via email.

In yet another alternate conversational system, a random forest machine-learning algorithm is executed. The random forest algorithm may train on predetermined empirical data, such as one-hundred data points. In training, the random forest algorithm samples with replacements for the one-hundred empirical data points (the $1^{st}$ random component). The second random component occurs as the algorithm builds its full-length decision trees. It first takes a random sub-set of the predictors that will split the one-hundred data points. So, if nine predetermined predictors are used, it may take a random number of those, say the square root of the total number of predictors, and evaluate the first split of the one-hundred data points using each of the three predictors. The algorithm selects the predictor that provided the best split and then applies another random sample of the nine predictors. The predictor generating the best split is applied. The process continues until a tolerance is reached or exceeded. The process does its predetermined number of iterations based on the total number of samples. Based on a measure of the output, a consensus is measured and determined. The random tree with the highest score is selected, and if its confidence level exceeds a predetermined threshold, is used to select a response. If not, the exchange is routed to the legacy chat-based system, which is served by an operator.

In yet another alternative system the machine learning algorithm comprises a super learner that may produce a recognition and response through multiple machine learning algorithms. The super learner takes disclosed machine learners or learning models, which include logistic regression, random forest, gradient boost, extreme gradient boost, recognition engine, and/or etc., and the algorithms disclosed herein and train versions of these algorithms using a grid or random search of a likely valid hyperparameter search. The process executes a cross validation and stores the cross-validated predictions in memory. The algorithm processes the predictions to form a new combined matrix, which renders a response vector. The process trains another model on the new set of data, which in turn renders the super learner model.

In yet another alternative, the training includes a feedback loop that trains the disclosed algorithms and models, including the super learner, without the need for human intervention. Using the systems and processes disclosed, the conversational system can train new models, while the current models are in operation. If the new developed algorithms (or models) exceed the performance of the existing algorithm (or models), the self-healing mechanism or apparatus described herein can terminate and delete old containers and deploy new containers and their respective conversational assistant pods 204 with the new model, without disrupting the continuous use of the conversational models during the chat session. This process follows the self-healing mechanism described above.

In yet another alternative, the elements, processes, and structures disclosed herein detect, recognize, and generate responses that may include images and/or videos (e.g., stored descriptions of graphic pictures). The graphic pictures may include a set of brightness and color values of pixels or as a set of instructions for generating or reproducing graphics, pictures, and/or videos. The machine learning and chat engines, for example, interface a vision engine in this alternative to detect and identify objects in images, pictures, and/or videos. Object identification occurs in one or many processes, including appearance-based methods (e.g., analyzing changes in lighting, color, direction, sizes or shapes, etc.), edge matching (e.g., using templates), greyscale matching using normalization and correlation, searching large model bases, feature methods (e.g., searching for corners and linear edges), interpretation trees (root node searches where each node represents a set of matches), geometric hashing, scale-invariant feature transform, speeded up robust features, and/or bag of words representations, and/or etc.

The term "machine learning" refers to devices or machines that execute machine learning algorithms which use processing units that simulate (or execute) character and/or image recognition. Some machine learning devices represent concepts in multiple hierarchical fashion which corresponds to various levels of abstraction. The decision tree algorithm builds trees sequentially in which later iterations train new trees on the error of the old trees. The learners (trees in this exemplary case) may be considered relatively weak at first, which means the accuracy of the model is below an acceptable threshold. The decision-trees give rise to different errors that future trees remediate to render a strong learner. The disclosed algorithm allows for better parallel computation by storing data in sorted in-memory blocks, and includes a cache awareness. Statistically speaking, the disclosed decision tree-based algorithm handles sparse data more efficiently and offers regularization (via a dimensionality reduction), which is not possible in conventional methods.

The term "coupled," disclosed in this description may encompass both direct and indirect coupling. Thus, a first and a second element are said to be coupled when they communicate directly with one another, as well as when the first element communicates through an intermediate component, which is connected directly or via one or more additional intermediate components to a second element. The term "and/or" generally refers to one or a series of possibilities of a series of stated possibilities. It is frequently used to refer to two possibilities. The term "cluster" refers to a group of independent network servers that operate—and appear to clients—as if they were a single server. Clustering improves network capacity by, among other things, enabling the servers within a cluster to shift work and balance loads by enabling one server to take over for another in response to the master node 208. Clustering also enhances network stability and minimizes or eliminates downtime caused by application, conversational assistant pod 204, container, or system failure. The term "substantially" or "about" encompasses a range that is largely, but not necessarily wholly, what is specified. It encompasses all but an insignificant amount, such as a variance within five or ten percent. When devices are responsive to commands, events, and/or requests, the actions and/or steps of the devices, such as the operations that devices are performing, necessarily occur as a direct or an indirect result of the preceding commands, events, actions, and/or requests. In other words, the operations occur as a result of the preceding operations. A device that is responsive to another requires more than an action (i.e., the device's response) to merely follow another action.

A conversational chatbot system and process interfaces any channel, system, application, device, legacy system, or combination. The system imitates human interactions. The conversational systems know when to access knowledge bases, seek clarity, and when to join one or more human operators to a chat session. The conversational assistant is trained on knowledge-based relevant content, allowing the conversational assistant to make sense of obscure topics and unusual inquires. Its clusters and orchestrations allow the conversational assistants to be adapted to many local and remote channels, systems, and mobile applications allowing the conversational systems to reach users when and where they are available. The conversational systems are powered by supervised and unsupervised learning algorithms, such as machine learning and/or and natural language models, that understand users and allows the conversational systems to communicate effectively with human users in real time. The conversational systems may reside at a local physical location, reside in a cloud environment, or be distributed amongst them allowing the conversational assistants to scale with an enterprise.

The subject-matter of the disclosure may also relate, among others, to the following aspects (referenced by numbers):

1. A method comprising:
   receiving, by a conversational assistant pod within a container device, a real time transmission of a text message from a sender to a receiver over a distributed network through a chat system that enables the receiver to transmit an automatically generated response in real time during a chat session;
   executing, by a modeling device, a machine learning model that recognizes characters within the real time transmission of the text message from the sender to the receiver over the distributed network;
   generating, by the conversational assistant pod within the container device, a prediction or classification automatically of the real time transmission of the text message received from the sender;
   generating, by the conversational assistant pod within the container device, a text response automatically to the text message received from the sender to the receiver over the distributed network;
   modifying an allocation of computing resources by replacing the conversational assistant pod and the container device with a second conversational assistant pod and a second container device running in the same operating state as the replaced conversational assistant pod and the container device during the chat session without interrupting the real time chat session.

2. The method of aspect 1 where the conversational assistant pod within the container device resides on an independent server that is associated with a group of servers that appear to clients as if they were a single server.

3. The method of any of aspects of 1 to 2 where the container device comprises the conversational assistant pod and one or more libraries.

4. The method of any of aspects of 1 to 3 where the machine learning model comprises a plurality of decision tree algorithms.

5. The method of any of aspects of 1 to 4 further comprising generating a chat vector, by a neural network, that represents measurable properties of the text message received from the sender.

6. The method of aspect 5 further comprising processing, by the machine learning model, the chat vector.

7. The method of aspect 6 further comprising processing the prediction or the classification by a supervised learning model.

8. The method of any of aspects of 1 to 7 where the text message comprises a text and an image and the modeling device recognizes texts and images.

9. The method of any of aspects of 1 to 8 further comprising mapping the prediction or classification text message from a sender to a receiver over the distributed network in metadata associated with the text message.

10. The method of any of aspects of 1 to 9 further comprising transmitting, by an input and output engine, a text message reply automatically in response to the prediction or classification.

11. The method of aspect 10 where the act of transmitting, by the input and output engine, a text message reply occurs in real time during the chat session.

12. The method of any of aspects of 1 to 11 where the act of replacing the conversational assistant pod and container comprises preventing the conversational assistant pod and the container device from receiving a second chat session.

13. The method of any of aspects of 1 to 12 where the act of replacing the conversational assistant pod and the container device comprises draining traffic from the conversational assistant pod and the container device during the chat session.

14. The method of any of aspects of 1 to 13 where the act of replacing the conversational assistant pod and container device occurs in response to a predicted failure of the conversational assistant pod and container and the replacement occurs before the conversational assistant pod and the container device fail.

15. The method of any of aspects of 1 to 14 where the machine learning model comprises a super learner that comprises a plurality of machine learning models.

16. A non-transitory machine-readable medium encoded with machine-executable instructions, where execution of the machine-executable instructions is for:
   receiving, by a conversational assistant pod within a container device, a real time transmission of a text message from a sender to a receiver over the distributed network through a chat system that enables the sender to transmit an automatically generated response in real time during a chat session;
   executing, by a modeling device, a machine learning model that recognizes characters within the real time transmission of the text message from the sender to the receiver over the distributed network;
   generating, by the conversational assistant pod within the container device, a prediction or classification automatically of the real time transmission of the text message received from the sender;
   generating, by the conversational assistant pod within the container device, a text response to the text message received from the sender automatically;
   modifying an allocation of computing resources by replacing the conversational assistant pod and the container device with a second conversational assistant pod and a second container device running in the same operating state as the replaced conversational assistant pod and the container device during the chat session without interrupting the real time chat session.

17. The non-transitory machine-readable medium of any aspect 16 where the conversational assistant pod within the container device resides on an independent server that is associated with a group of servers that appear to clients as if they were a single server.

18. The non-transitory machine-readable medium of any aspects of 16 to 17 where the container device comprises the conversational assistant pod and one or more libraries.

19. The non-transitory machine-readable medium of any aspects of 16 to 18 where the machine learning model comprise a plurality of decision tree algorithms.

20. The non-transitory machine-readable medium of any aspects of 16 to 19 further comprising generating a chat vector, by a neural network, that represents measurable properties of the text message received from the sender.

21. The non-transitory machine-readable medium of any aspect 20 further comprising processing, by the machine learning model, the chat vector.

22. The non-transitory machine-readable medium of any aspect 21 further comprising processing the prediction or the classification by a supervised learning model.

23. The non-transitory machine-readable medium of any aspects of 16 to 22 where the text message comprises a text and an image and the modeling device recognizes texts and images.

24. The non-transitory machine-readable medium of any aspects of 16 to 23 further comprising mapping the prediction or classification text message from a sender to a receiver over the distributed network in metadata associated with the text message.

25. The non-transitory machine-readable medium of any aspects of 16 to 24 further comprising transmitting, by an input and an output engine, a text message reply automatically in response to the prediction or classification.

26. The non-transitory machine-readable medium of any aspects of 16 to 25 where the act of transmitting, by the input and the output engine, a text message reply occurs in real time during the chat session.

27. The non-transitory machine-readable medium of any aspects of 16 to 26 where the act of replacing the conversational assistant pod and container comprises preventing the conversational assistant pod and the container device from receiving a second chat session.

28. The non-transitory machine-readable medium of any aspects of 16 to 28 where the act of replacing the conversational assistant pod and container device comprises draining traffic from the conversational assistant pod and the container device during the chat session.

29. The non-transitory machine-readable medium of any aspects of 16 to 28 where the act of replacing the conversational assistant pod and the container device occurs in response to a predicted failure of the conversational assistant pod and the container device and the replacement occurs before the conversational assistant pod and the container device fail.

30. The non-transitory machine-readable medium of any aspects of 16 to 29 where the machine learning model comprises a super learner that comprises a plurality of machine learning models.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A non-transitory machine-readable medium encoded with machine-executable instructions, where execution of the machine-executable instructions is for:
   receiving, by a conversational assistant pod within an on-line chat system, a free-form input from a user through a distributed network, by which the on-line chat system automatically generates a reply in response to the free-form input during a chat session;
   processing the free-form input through a grammar-based natural language recognition that compares the free-form input to a vocabulary, the grammar-based natural language recognition recognizes text from the free-form input by matching the free-form input to the vocabulary;

scoring a recognized text through a machine learning model served by the conversational assistant pod that reflects a probability that the recognized text matches the free-form input from the user;

selecting a pre-generated response from a knowledge base based on the scoring of the recognized text to render the reply;

transmitting the pre-generated response to the user contemporaneously with the free-form input received from the user;

where a master node is programmed to drain traffic from the conversational assistant pod when an operating condition that precedes a failure is detected and routing further processing to a second conversational assistant pod during a session that comprises conversation with the user; and where the second conversational assistant pod is in a same operating state as the conversational assistant pod before the conversational assistant pod fails.

2. The non-transitory machine-readable medium of claim 1 where the free-form input comprises a textual input and an image input.

3. The non-transitory machine-readable medium of claim 1 where the free-form input comprises a textual input and one or more emails.

4. The non-transitory machine-readable medium of claim 1 where the conversational assistant pod resides in a cloud.

5. The non-transitory machine-readable medium of claim 1 further comprising a container hosting the conversational assistant pod that is responsive, the conversational assistant pod, the container, and the master node, residing on a conversational cluster that is remote from and responsive to a primary cluster.

6. The non-transitory machine-readable medium of claim 5 where the primary cluster schedules a plurality of conversational clusters based on running workloads processed by the plurality of conversational clusters and the master node schedules a plurality of worker nodes comprising a plurality of containers based on an operating capacity of the plurality of worker nodes.

7. The non-transitory machine-readable medium of claim 5 where the container comprises a standalone software that includes the conversational assistant pod, a plurality of application libraries, a runtime software, a plurality of system tools, and a plurality of system libraries.

8. The non-transitory machine-readable medium of claim 1 where the machine learning model comprises a neural network.

9. The non-transitory machine-readable medium of claim 1 where the machine learning model comprises an ensemble of machine learning networks that are automatically trained via a feedback loop without a human intervention.

10. The non-transitory machine-readable medium of claim 1 where the recognized text comprises a weighted text based on an association with pre-identified intents that represent an intended purpose of a textual expression.

11. The non-transitory machine-readable medium of claim 1 further comprising mapping the scoring in metadata and associating the metadata associated with the free-form input.

12. The non-transitory machine-readable medium of claim 1 where the machine learning model comprises a multi-tree ensemble of networks joined serially that update a learning algorithm's residual errors.

13. The non-transitory machine-readable medium of claim 1 where the pre-generated response comprises a textual message and a of static image.

14. The non-transitory machine-readable medium of claim 1 where the pre-generated response comprises video responses accessible through an executable link.

15. The non-transitory machine-readable medium of claim 1 further comprising authenticating the user before initiating the chat session and tailoring the pre-generated response based on a profile associated with an authenticated user.

16. The non-transitory machine-readable medium of claim 1 further comprising a plurality of containers each hosting a plurality of conversational assistant pods that are responsive only to the master node within a conversational cluster, where the free-form input is assigned to a single conversational assistant pod through a round-robin delegation by the master node.

17. The non-transitory machine-readable medium of claim 1 where the conversational assistant pod provides for on-line insurance servicing through an on-line claims processing.

18. The non-transitory machine-readable medium of claim 1 where the conversational assistant pod provides for on-line insurance servicing through an on-line insurance quoting.

19. The non-transitory machine-readable medium of claim 1 further comprising a plurality of containers each hosting a plurality of conversational assistant pods that are responsive to the master node within a conversational cluster, where the free-form input is assigned to a single conversational assistant pod through a round-robin delegation by the master node.

20. A method comprising:

receiving, by a conversational assistant pod within an on-line chat system, a free-form input from a user through a distributed network, by which the on-line chat system automatically generates a reply in response to the free-form input during a chat session;

processing the free-form input through a grammar-based natural language recognition that compares the free-form input to a vocabulary, the grammar-based natural language recognition recognizes text from the free-form input by matching the free-form input to the vocabulary;

scoring a recognized text through a machine learning model served by the conversational assistant pod that reflects a probability that the recognized text matches the free-form input from the user;

selecting a pre-generated response from a knowledge base based on the scoring of the recognized text to render the reply; and transmitting the pre-generated response to the user contemporaneously with the free-form input received from the user;

where a master node is programmed to drain traffic from the conversational assistant pod when an operating condition that precedes a failure is detected and routing further processing to a second conversational assistant pod during a session that comprises conversation with the user; and where the second conversational assistant pod is in a same operating state as the conversational assistant pod before the conversational assistant pod fails.

21. The method of claim 20 where the free-form input comprises a textual input and an image input.

22. The method of claim 20 where the free-form input comprises a textual input and one or more emails.

23. The method of claim 20 where the conversational assistant pod resides in a cloud.

24. The method of claim 20 further comprising a container hosting the conversational assistant pod that is responsive the conversational assistant pod, the container, and the master node, residing on a conversational cluster that is remote from and responsive to a primary cluster.

25. The method of claim 24 where the primary cluster schedules a plurality of conversational clusters based on running workloads processed by the plurality of conversational clusters and the master node schedules a plurality of worker nodes comprising a plurality of containers based on an operating capacity of the plurality of worker nodes.

26. The method of claim 24 where the container comprises a standalone software that includes the conversational assistant pod, a plurality of application libraries, a runtime software, a plurality of system tools, and a plurality of system libraries.

27. The method of claim 20 where the machine learning model comprises a neural network.

28. The method of claim 20 where the machine learning model comprises an ensemble of machine learning networks that are automatically trained via a feedback loop without a human intervention.

29. The method of claim 20 where the recognized text comprises a weighted text based on an association with pre-identified intents that represent an intended purpose of a textual expression.

30. The method of claim 20 further comprising mapping the scoring in metadata and associating the metadata associated with the free-form input.

31. The method of claim 20 where the machine learning model comprises a multi-tree ensemble of networks joined serially that update a learning algorithm's residual errors.

32. The method of claim 20 where the pre-generated response comprises a textual message and a of static image.

33. The method of claim 20 where the pre-generated response comprises video responses accessible through an executable link.

34. The method of claim 20 further comprising authenticating the user before initiating the chat session and tailoring the pre-generated response based on a profile associated with an authenticated user.

35. The method of claim 20 further comprising a plurality of containers each hosting a plurality of conversational assistant pods that are responsive only to the master node within a conversational cluster, where the free-form input is assigned to a single conversational assistant pod through a round-robin delegation by the master node.

36. The method of claim 20 where the conversational assistant pod provides for on-line insurance servicing through an on-line claims processing.

37. The method of claim 20 where the conversational assistant pod provides for on-line insurance servicing through an on-line insurance quoting.

38. The method of claim 20 further comprising a container hosting the conversational assistant pod that is responsive to the conversational assistant pod, the container, and the master node, residing on a conversational cluster that is remote from and responsive to a primary cluster.

* * * * *